United States Patent [19]
Itoh

[11] Patent Number: 5,566,498
[45] Date of Patent: Oct. 22, 1996

[54] MECHANISM FOR MOVING AND HOLDING BALANCE-WEIGHT IN LURE

[75] Inventor: Koichi Itoh, Shizuoka, Japan

[73] Assignee: Megabass Co., Ltd., Shizuoka, Japan

[21] Appl. No.: 341,614

[22] PCT Filed: Mar. 17, 1994

[86] PCT No.: PCT/JP94/00432

§ 371 Date: Nov. 16, 1994

§ 102(e) Date: Nov. 16, 1994

[87] PCT Pub. No.: WO94/21112

PCT Pub. Date: Sep. 29, 1994

[30] Foreign Application Priority Data

Mar. 19, 1993 [JP] Japan ............... 5-018625 U

[51] Int. Cl.⁶ .................................................. A01K 85/00
[52] U.S. Cl. ................ 43/42.31; 43/42.39; 43/42.06
[58] Field of Search ................... 43/42.06, 42.39, 43/42.31, 42.22

[56] References Cited

U.S. PATENT DOCUMENTS

| | | | |
|---|---|---|---|
| 2,488,678 | 11/1949 | Nardi | 43/42.31 |
| 2,716,831 | 9/1955 | Glass | 43/42.31 |
| 2,718,725 | 9/1955 | Thurman | 43/42.31 |
| 3,894,350 | 7/1975 | Parker | 43/42.31 |
| 4,223,469 | 9/1980 | Luz | 43/42.03 |
| 4,483,091 | 11/1984 | Norlin | 43/42.31 |
| 4,761,910 | 8/1988 | Ninomiya | 43/42.31 |
| 5,134,799 | 8/1992 | Trnka | 43/42.22 |
| 5,276,992 | 1/1994 | Kato | 43/42.06 |

FOREIGN PATENT DOCUMENTS

| | | |
|---|---|---|
| 50-30302 | 9/1975 | Japan . |
| 3-15021 | 4/1991 | Japan . |
| 3-103134 | 4/1991 | Japan . |

Primary Examiner—Joseph J. Hail, III
Assistant Examiner—James Miner
Attorney, Agent, or Firm—Hill, Steadman & Simpson

[57] ABSTRACT

In a lure, a mechanism is provided for moving and holding a balance-weight having a lip (2) mounted at a front end portion of a lure body (1) and a balance-weight (9) incorporated in the lure body (1). The balance-weight (9) is adopted to be movable along a longitudinal direction of the lure body (1). The balance-weight (9) moves along a longitudinal direction of the lure body (1) by rolling along a guide (10). The guide (10) has a pocket (10a) provided at a front end portion thereof. The balance-weight (9) can be held within the pocket (10a).

10 Claims, 20 Drawing Sheets

5,566,498

MECHANISM FOR MOVING AND HOLDING BALANCE-WEIGHT IN LURE

TECHNICAL FIELD

This invention relates to the structure of a fishing lure, particularly to the crank-bait lure classified as a lure for aiming at deep spots.

BACKGROUND ART

The plug lure, for example, a crank-bait lure requires a diving lip (diving plate) and a large balance-weight within its lure body. In a lure which is designed to be able to aim at deep spots, the diving lip must be enlarged. Since the shape factor of such an enlarged lip increases the air resistance against the lure body, it will be difficult to get a long flying distance of the lure body.

On the other hand, in order to perform only a long casting without aiming at deep spots, a balance-weight 120 would be fixed in the rearmost portion of the lure body 110 as shown in FIG. 1. The lure whose centroid is set in the rear portion of its lure body 110 cannot be influenced by the shape factor of the lip. Thereby, the lure may be cast for a long distance. However, when the balance-weight 120 is fixed like this, the centroid is set in the rear portion as described above. This results in a problem that the crank-bait lure of this type could not go underwater deeply, and that a swimming balance would be lost. Thus, in the crank-bait lure provided by the prior art, it is difficult to make a casting performance compatible to an underwater cruising performance.

There is also known a lure of another type, in which a magnet provided in the front portion of the lure body, can draw and hold a balance-weight by its magnetic force. In case of this lure, its mechanical structure will be more complicated, and the number of parts is increasing.

An object of the present invention is, in view of the above problems, to provide a mechanism for moving and holding a balance-weight, which can provide a casting performance compatible to an underwater cruising performance, and give superior functions in the lure.

Another object of the present invention is to provide a mechanism for moving and holding a balance-weight, which is constructed simply, and that can hold the balance-weight in an optimum position, to thereby obtain its appropriate pose for under water cruising.

SUMMARY OF THE INVENTION

A mechanism for moving and holding a balance-weight in the lure in accordance with the present invention, comprises a lip mounted at the front end portion of a lure body and a balance-weight incorporated in the lure body, wherein the balance-weight is adopted to be movable along a longitudinal direction of the lure body. Particularly, the balance-weight can move in a longitudinal direction by rolling on a guide having a pocket provided in the front end portion thereof, and the balance-weight can be held within the pocket.

Since the balance-weight is movable in a longitudinal direction, it moves to the rearmost portion of the lure body during casting, thereby a long casting can be achieved. After casting, the balance-weight then moves to the frontmost portion of the lure body in which a optimum centroid for underwater cruising is given. Thereby, a superior casting performance is obtained.

In this case, as there is provided the pocket in the front end portion of the guide for guiding the balance-weight, it can be held within the pocket, thereby the lure body maintains its constant pose so that a good swimming balance for going underwater is obtained.

In accordance with another aspect of the present invention, the lure comprises a lip mounted at the front end portion of a lure body and a balance-weight incorporated in the lure body, wherein the balance-weight is adopted to be movable along a longitudinal direction of the lure body by rolling on a guide, and a holder having a cover is provided in the front end portion of the guide so that the balance-weight can be held within it. Particularly, the holder is formed as a relatively deep recess.

In this kind of lure as afore-mentioned, the balance-weight is generally fixed in the rearmost portion of the lure body to set its centroid in the rear of the lure in order to perform a long casting. In accordance with a mechanism provided by the present invention, since the balance-weight is movable in a longitudinal direction, it moves to the rearmost portion of the lure body so that the centroid of it is set in the rear thereof. On the other hand, the balance-weight can be inserted into a holder provided in the front of the lure body. It is now assumed that the balance-weight is inserted into the holder when the lure body is suspended from a fishing rod through a fishing line. In this case, once the fishing rod is bent downward, thereby the lure body drops in a slight stroke with swinging. The balance-weight then gets over an edge of the holder, and drifts away therefrom because of the inertia of itself and some degrees of shock caused at that time. The balance-weight then moves to the rearmost portion of the lure body while a long casting can be achieved.

When the fishing line is drawn after alighting on the water, the lure body inclines on the front side based on the water resistance against the lip. The balance-weight then moves to the frontmost portion of the lure body optimum for underwater cruising, thereby the balance-weight is inserted into the holder and held therein. Thus, the insertion of the balance-weight into the holder can set the centroid of the lure body in the front thereof, and the lure body maintains its optimum pose for going underwater.

In the above-mentioned case, as the holder is formed as a relatively deep recess, the balance-weight inserted into the holder is certainly held therein. Particularly, even though the lure body going underwater touches or collides with an obstacle in the bottom of the lake or the sea, the lure body is prevented from drifting away from the holder. That is to say, the holder formed as such a recess in accordance with the present invention holds the balance-weight so that a cover envelops it, thereby the balance-weight inserted into the holder is certainly held therein. Accordingly, there is no danger the balance-weight will drop out from the holder when the lure body touches with an obstacle in the bottom of the lake.

In accordance with another aspect of the present invention, a mechanism comprises a guide for supporting a balance-weight in a rolling-free manner, being provided along a longitudinal direction of a lure body, a pocket defined by holding plates protruding in a curve from the front end of the guide, and a gate formed in the manner of spreading forward, by partially cutting down the pocket, wherein the balance-weight can be held within the pocket.

Particularly, the balance-weight can drift away from the pocket through the gate, when the lure body is in an almost vertical state. A regulating plate also is hung down at the front of the pocket.

In this feature of the present invention, the balance-weight can be movable in a longitudinal direction by rolling on the guide. The balance-weight moves to the rearmost portion of the lure body during casting, thereby a long casting can be achieved. And, when the fishing line is drawn after alighting on the water, the lure body inclines on the front side, thereby the balance-weight then moves to the frontmost portion of the lure body in which the optimum centroid for underwater cruising is given.

Since the balance-weight moved along the guide is held within the pocket continuously provided in the front end of the guide, it cannot move easily while going underwater. And also, even though the lure body going underwater touches with an obstacle, the balance-weight is certainly held within the pocket.

The pocket has the gate formed in the manner of spreading forward through which the balance-weight can drift away from the pocket. In the casting action, the lure body will take a vertical pose once. When the lure body takes such a vertical pose, the balance-weight drifts away from the pocket through the gate. The balance-weight locked within the pocket is automatically released from locking, thereby it is possible to set the centroid of the lure body optimum for casting, and to shift to the next casting action.

The regulating plate is also hung down at the front of the pocket as mentioned above. Even though the lure body touches with an obstacle, the regulating plate prevents the balance-weight from drifting up, and it can be stable within the pocket.

DETAILED DESCRIPTION OF THE PRESENTLY PREFERRED EMBODIMENTS

Figure 1:
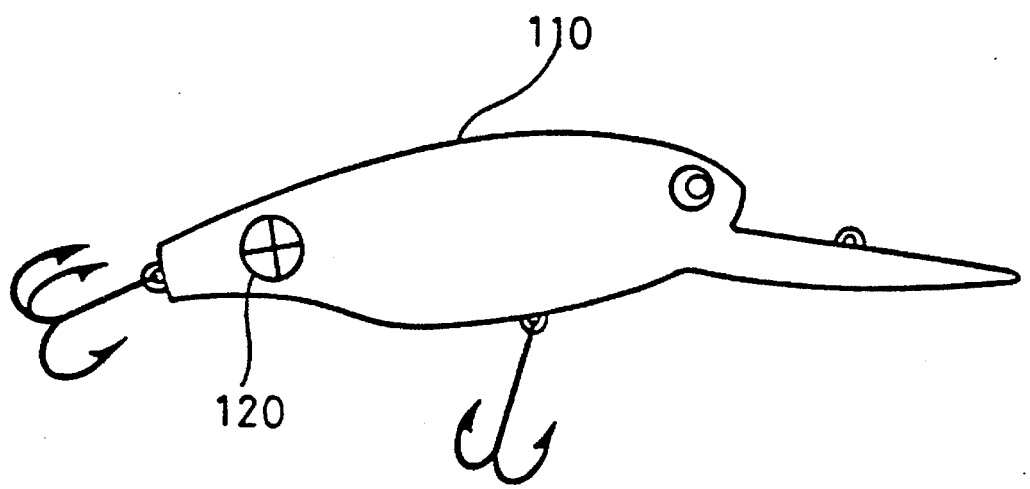
FIG. 1 shows a structure of the crank-bait lure in the prior art.
Figure 2:
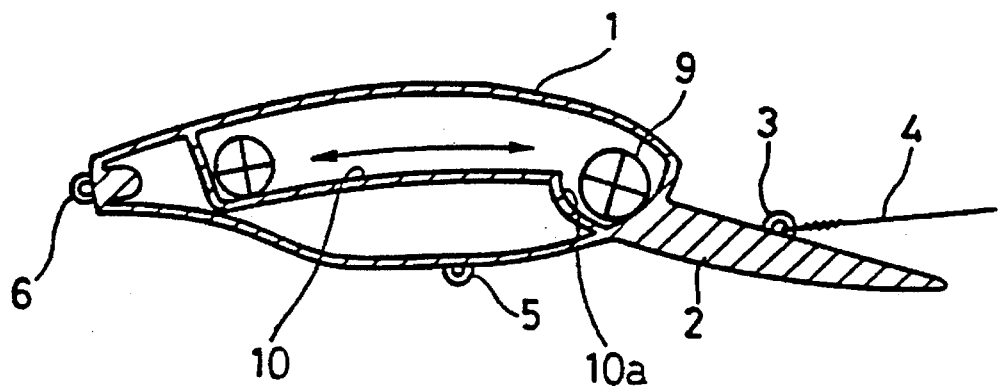
FIG. 2 shows a vertically sectional view of the first embodiment according to the present invention.

The first embodiment of a mechanism for moving and holding a balance-weight in the lure in accordance with the present invention will be explained with reference to FIG. 1~FIG. 7. FIG. 2 shows an exemplary structure of the lure in accordance with the present invention. In FIG. 2, the numeral 1 indicates a lure body, the numeral 2 indicates a lip (diving plate) mounted at the front end portion of the lure body 1, and the numeral 3 indicates a line ring provided in the lip 2. A line 4 is tied to the line ring 3. The numerals 5 and 6 indicate hook-hangers with which a front hook 7 and a rear hook 8 are combined respectively. The lure body 1 is made of plastics, and has an outer shape alike to a small fish and a hollow structure. The lip 2 is provided in the manner to incline moderately downward relative to the lure body 1.

In FIG. 2, the numeral 9 further indicates a balance-weight incorporated in the lure body 1, which is composed of a metallic sphere of light weight. The numeral 10 indicates a guide for the balance-weight 9. The balance-weight 9 can move in a longitudinal direction by rolling on the guide 10. There is provided a pocket 10a of a recess in the front end portion of the guide 10, within which the balance-weight 9 can be held.

The mechanism for moving and holding a balance-weight in the lure in accordance with this embodiment is constructed as mentioned above. The functions of it will be explained as follows.

Figure 3A:
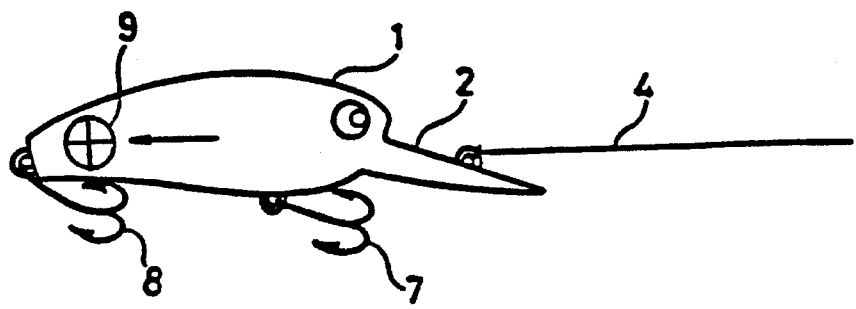
FIG. 3(a), 3(b) and 3(c) show diagrams indicating conditions between a casting action and the start of underwater cruising in which the lure according to the present invention can be set.

FIGS. 3(a), (b) and (c) indicate in order the variation of conditions of the lure according to the present invention between a casting action and the start of an underwater cruising. In the casting action (see FIG. 3(a)), the balance-weight 9 moves to the rearmost portion. Thereby, a stable long casting of the lure body 1 can be achieved because of its inertia without influences of its shape factor.

Figure 3B:
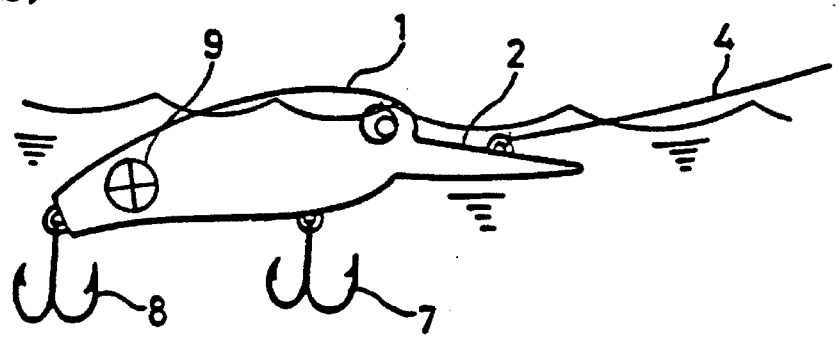
Figure 3C:
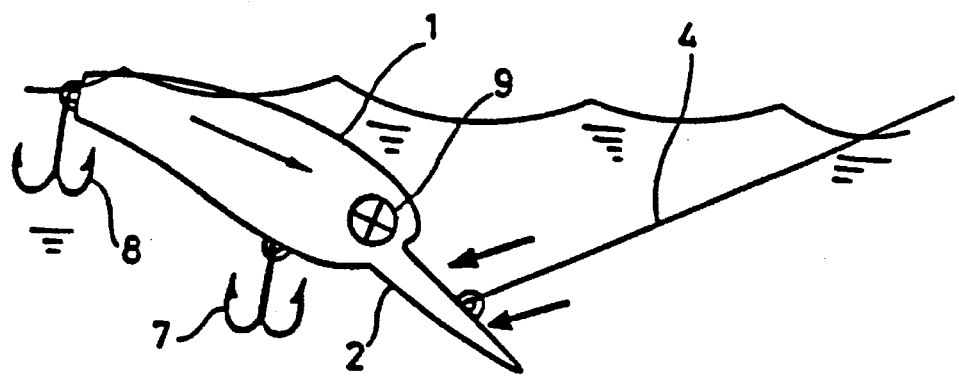

The cast lure body 1, after alighting on the water, is floating on the surface of the water as shown in FIG. 3(b). When the line 4 tied to the line ring 3 is then drawn, the lure body 1 inclines on the front side based on the water resistance against the lip 2. As the balance-weight 9 is not so heavy in this case, the lure body 1 in its floating condition does not intend to extremely incline relative to a vertical direction as shown in FIG. 3(b). Accordingly, the lure body 1 can shift smoothly and speedily from its floating condition to a condition as shown in FIG. 3(c). The balance-weight 9 moves to the frontmost portion of the lure body 1 optimum for underwater cruising when it rolls on the guide 10. The balance-weight 9 which has moved to the frontmost portion of the lure body 1 is then inserted into the pocket 10a, and is held therein.

Figure 4:
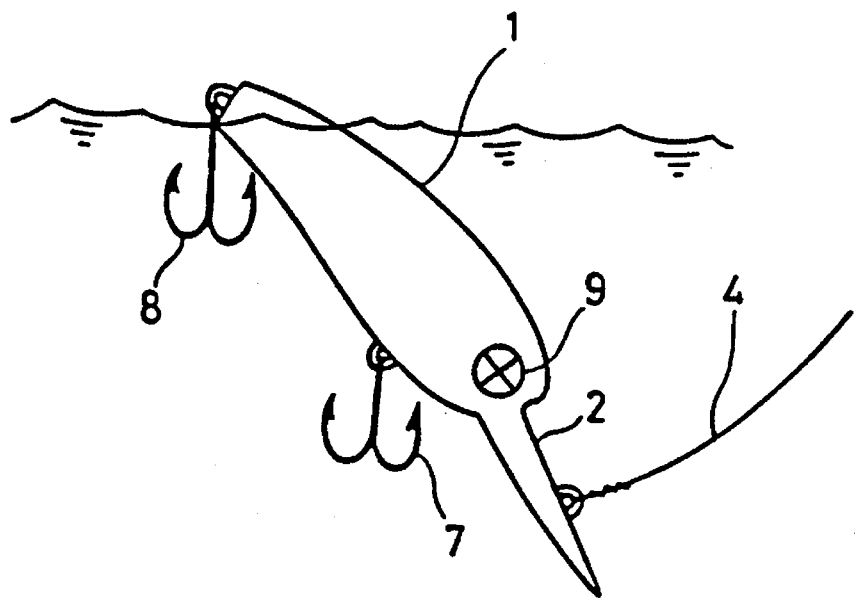
FIG. 4 shows a diagram indicating a floating condition of the lure according to the present invention.

Since the balance-weight 9 has been held within the pocket 10a, the lure body 1 can get into an inclined pose as shown in FIG. 4 to easily encounter the water resistance. It is thereby possible to aim points in the bottom of the lake.

Thus, the lure starts underwater cruising. During underwater cruising, even though the lure touches with an obstacle in the bottom of the lake, the balance-weight 9 can be certainly held within the pocket 10a, and it never moves to the rear portion of the lure body 1. Thereby, the lure body 1 maintains its constant pose so that a good swimming balance for going underwater is obtained.

Figure 6:
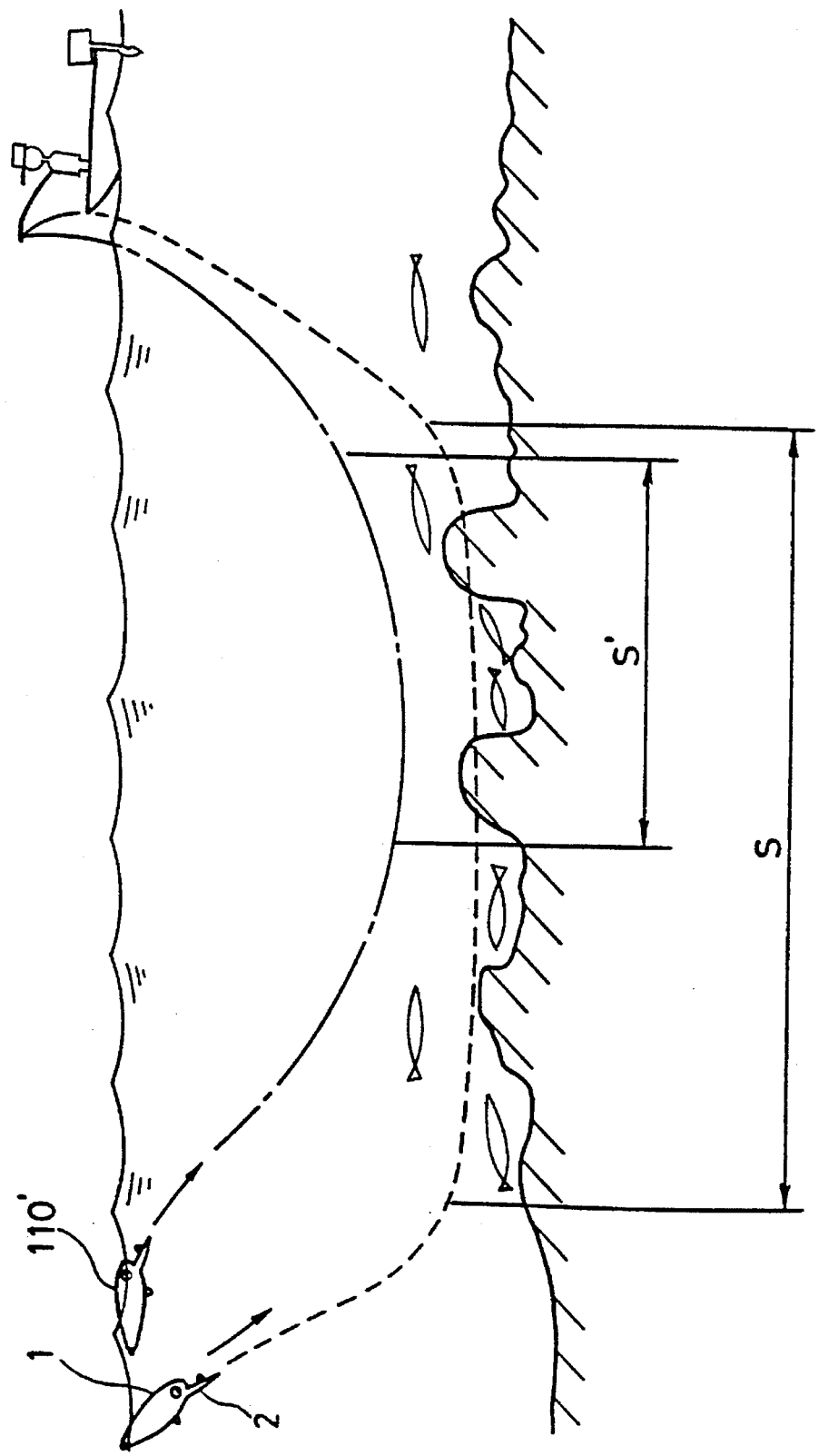
FIG. 6 shows a diagram indicating a trace of underwater cruising of the lure according to the present invention with comparison to the prior art.

FIG. 6 indicates an example of a trace of underwater cruising in the lure according to this embodiment. On the occasion of going underwater, the lure is floating as shown in FIG. 4, and then swims with a trace (see the dashed line) as shown in FIG. 6. Since the balance-weight 9 is held within the pocket 10a as above mentioned, the lure can go underwater in high speed, and thereby it can speedily arrive at many points in the bottom of the lake. It will be possible to search for a shoal over a wide area S, resulting in superior fishing functions of the lure.

Figure 5:
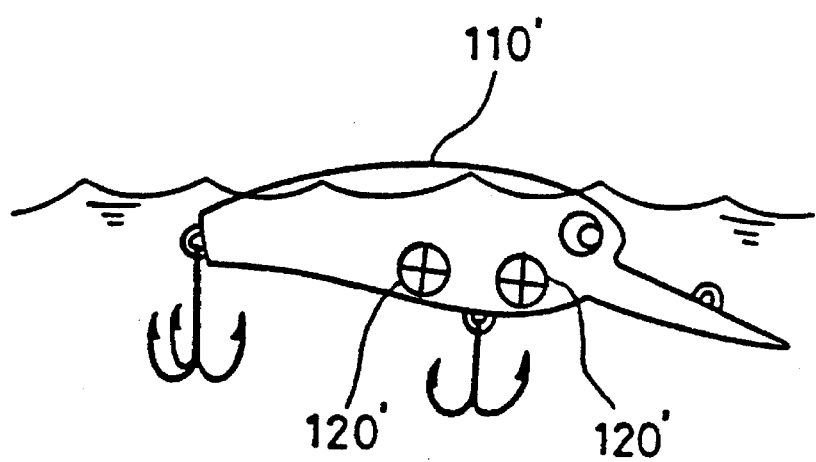
FIG. 5 shows a diagram indicating a floating condition of the lure according to the prior art as a comparative example for the present invention in which a balance-weight is fixed in the frontmost portion.

Referring to FIG. 5, there is known a lure in which a balance-weight 120' is fixed in the frontmost portion of a lure body 110'. In this lure, however, as the balance-weight 120' is positioned in the frontmost portion of a lure body 110', a lateral wind against the lure body 110' causes a line to get twisted based on the rolling of it. Furthermore, there is a problem that long casting distances cannot be obtained.

The lure floating as illustrated in FIG. 5 has its trace of underwater cruising indicated by the dashed line. In such a lure, there can be merely obtained a shallow and narrow area S' which is effective for fishing. In accordance with the present invention, a deep and wide area S which is effective for fishing is obtained as mentioned above.

Figure 7:
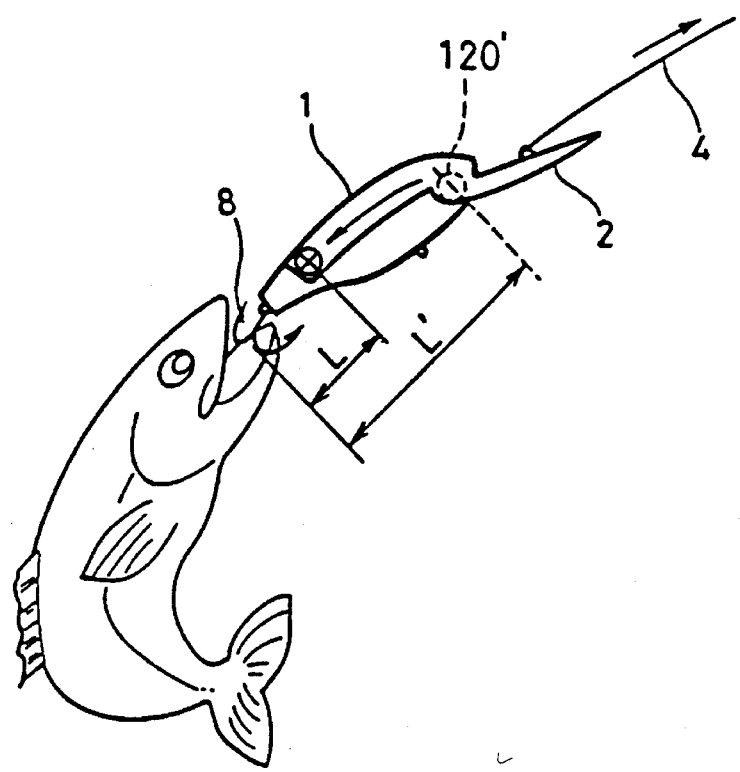
FIG. 7 shows the lure according to the present invention in which a fish is caught.

In accordance with the present invention, furthermore, it is possible to prevent a caught fish from being unhooked. In FIG. 7, as a rod is always positioned above the fish, there is given a small distance L between the balance-weight 9 and the fish (a mouth of the fish). This results in that the lure body 1 cannot be extremely swung by a raging fish, accordingly the fish could not be unhooked.

In the lure as shown in FIG. 5, since there is given a large distance L' between the balance-weight 120' and the fish, the lure body 110' will be swung to the high degree when the fish rages. This results in a problem that the caught fish can be easily unhooked.

Figure 8:
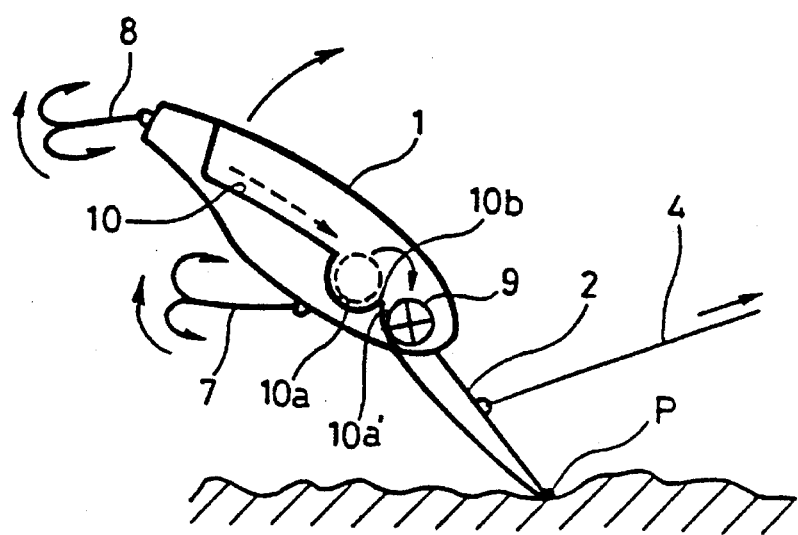
FIG. 8 shows a modification of the first embodiment.

In the first embodiment, the pocket 10a and 10a' may be provided continuously front and rear as shown in FIG. 8. In this case, a projecting portion 10b is provided between pockets 10a and 10a'. The pocket 10a is located in a position suitable for underwater cruising, while the pocket 10a' is located in the frontmost portion of the lure body 1.

In accordance with such an arrangement of pockets 10a and 10a' continuously provided, for example, in case that the lip 2 touches with an obstacle in the bottom of the lake, the lure body 1 will rotate around a point(point P). The balance-weight 9 inserted into the pocket 10a then gets over the projecting portion 10b, and moves to the pocket 10a'. Thus, the front hook 7 and the rear hook 8 spring, and are removed from the bottom of the lake at the same time the lure body 1 leaps up based on, so to speak the principle of leverage. And, the front hook 7 and the rear hook 8 are prevented from engaging with an obstacle in the bottom of the lake. The prior lure (for example, as shown in FIG. 5) slides along the bottom of the lake without revolution when it reaches the bottom of the lake, accordingly it is so dangerous that the hook easily engages the bottom of the lake.

Figure 9:
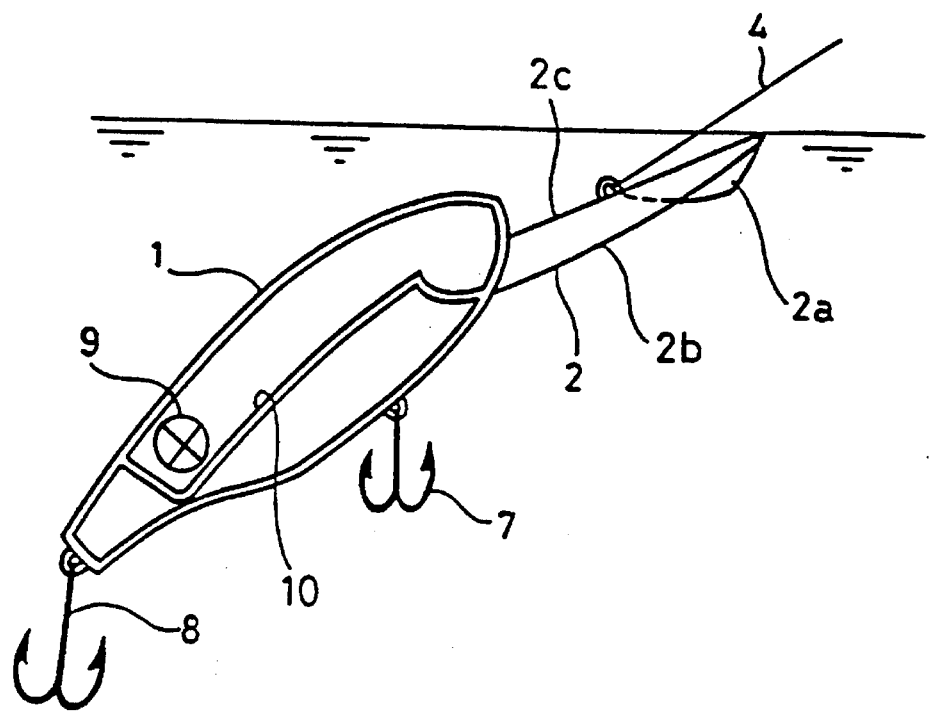
FIG. 9 shows a vertically sectional view of a lip with an exemplary structure in the first embodiment.
Figure 10:
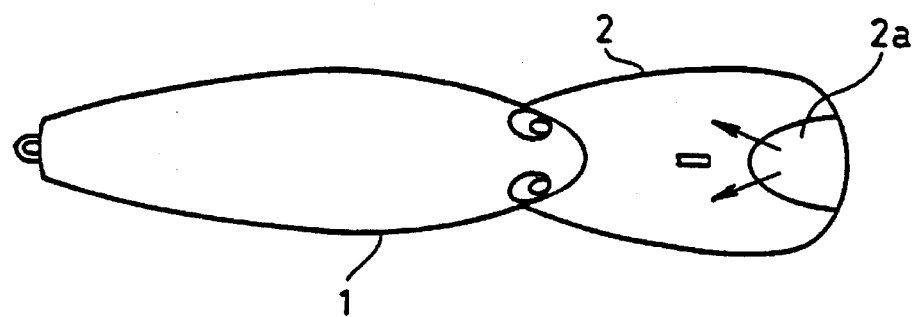
FIG. 10 shows a top view of the lure having the lip with an exemplary structure in the first embodiment.
Figure 11:
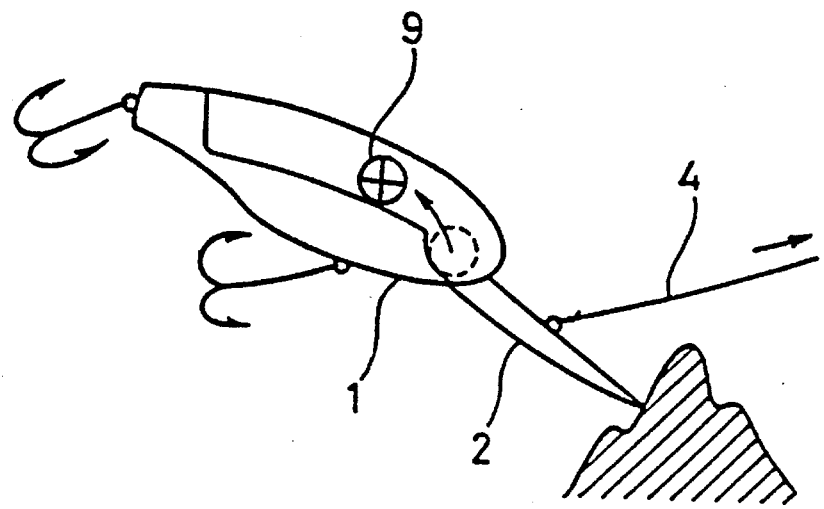
FIG. 11 shows a diagram indicating functions of the lure according to the present invention during the touch with an obstacle.

FIG. 9 and FIG. 10 indicate the modification of the first embodiment. In this exemplary structure, an inlet 2a into which the water follows is opened at the front end portion of the lip 2. The inlet 2a is formed such as to protrude to a back side of the lip 2 in the manner to generate a water flow from the point of the lip 2 to a right surface 2c.

Here is now illustrated the lure wafting as shown in FIG. 9, in which the balance-weight 9 moves to the rear. In the lure of such a condition, the large lip 2 easily encounters the water resistance against back side 2b of it. In this manner, it will take a lot of time to make the balance-weight 9 move to the front for purpose of obtaining a pose for going underwater. As the lip 2 leans to the front by water follow through the inlet 2a, the time necessary to shift to underwater cruising from a wafting condition will be shortened to a high degree. Thus, the advantage of an arrangement of the movable balance-weight 9 is maintained, while it is possible to cause the balance-weight 9 to perform its proper functions effectively.

In accordance with the mechanism for moving and holding a balance-weight of this embodiment, a long casting can be achieved, and a trace of underwater cruising effective for fishing can be obtained. Accordingly, there can be realized a superior performance compatible to an underwater cruising performance, which has never been realized by the prior art.

As mentioned above, the balance-weight 9 is held within the pocket 10a. It is here assumed that the lure collides with an obstacle in the bottom of the lake. In this case, there may be a possibility that the balance-weight 9 removed from the pocket 10a will move to the rear based on a head-on collision with the obstacle.

In accordance with the second embodiment of the present invention, a mechanism for moving and holding a balance weight, which is constructed simply, and can hold the balance weight in an optimum position, thereby its appropriate pose for underwater cruising can be obtained.

Figure 12:
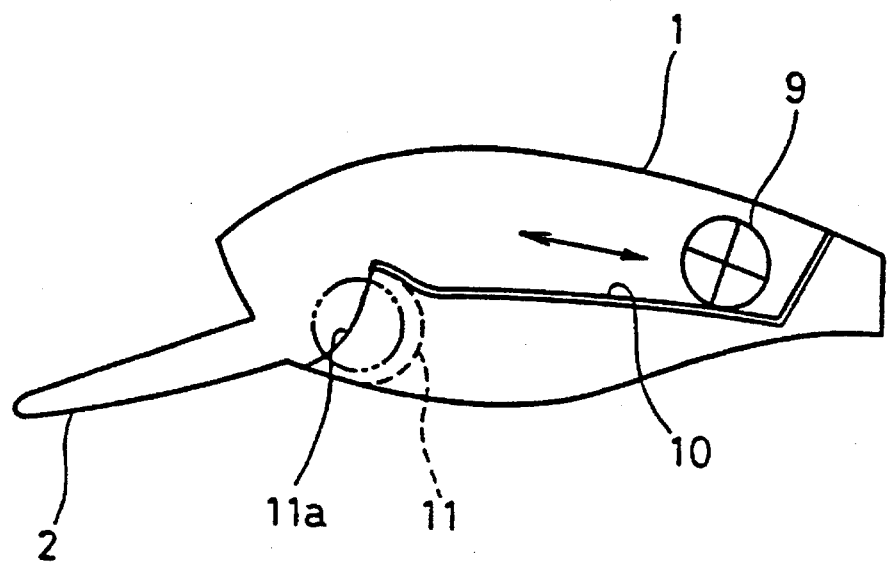
FIG. 12 shows a sectional view of the second embodiment according to the present invention.

FIG. 12 shows a schematic view of the second embodiment according to the present invention. In FIG. 12, the numeral 1 indicates a lure body which is made of plastics, and has a outer shape similar to a small fish and a hollow structure, and the numeral 2 indicates a lip mounted at the front end portion of the lure body 1 being provided in the manner to incline moderately downward relative to the lure body 1. The numeral 9 further indicates a balance-weight incorporated in the lure body 1, which is composed of a metallic sphere of light weight. The numeral 10 indicates a guide for balance-weight 9 being formed such that the balance-weight 9 can move in a longitudinal direction by rolling on it.

The numeral 11 indicates a holder which is formed as a relatively deep recess in the front end portion of the guide 10. The holder 11 has its dimension determined such that the balance -weight 9 can insert into it. A cover 11a is provided in an opening edge of the holder 11. As shown FIG. 15, a line ring 3 to which a line 4 is tied is provided in a reasonable portion of the lip 2. A front hook 7 and a rear hook 8 are supported by the lure body 1 respectively.

The mechanism for moving and holding a balance-weight in the lure in accordance with the this embodiment is constructed as mentioned above. The functions of it will be explained as follows.

As afore-mentioned, the centroid of the lure will be set in the rear portion of its lure body in order to perform a long casting. In this embodiment, the balance-weight 9 is adopted to be able to insert into the holder 11. The operation during casting will be next explained referring to FIGS. 13(a), (b), (c) and FIGS. 14(a), (b) and (c). Still now, FIGS. 13(a), (b) and (c) correspond to FIG. 14(a), (b) and (c) respectively.

Figure 13A:
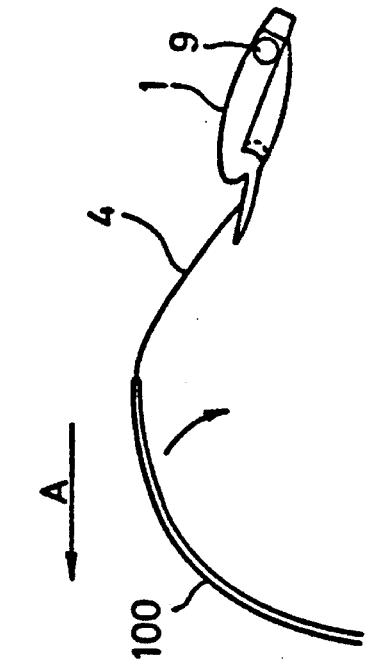
FIGS. 13(a), 13(b) and 13(c) shows schematic diagrams indicating functions of the lure during casting in the second embodiment.
Figure 13B:
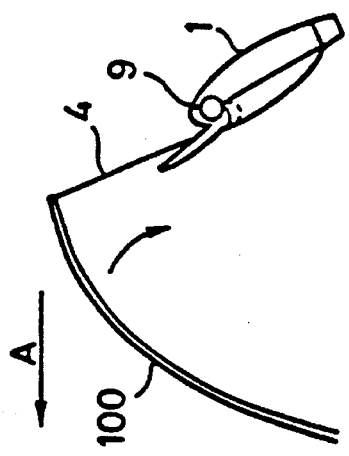
Figure 14A:
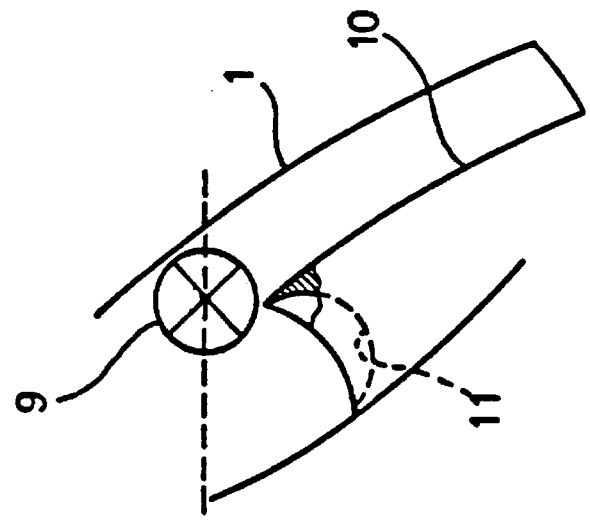
FIGS. 14(a), 14(b) and 14(c) shows partial sectional views indicating functions of the lure during casting in the second embodiment.
Figure 14B:
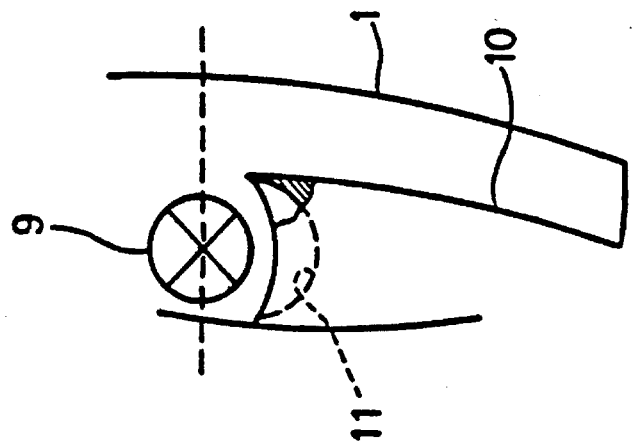

It is here assumed that the balance-weight 9 is inserted into the holder 11 (FIG. 13(a) and FIG. 14(a)). A casting direction is indicated by arrow A in FIGS. 13(a), (b) and (c) and the lure body 1 is hung down from a fishing rod 100 through fishing line 4. In this case, once the fishing rod 100 is bent downward, then the lure body 1 drops in a slight stroke with swinging. The balance-weight 9 then floats off slightly relative to the holder 11 as shown in FIG. 14(b) because of the inertia of itself and some degrees of shock caused at that time.

Figure 13C:
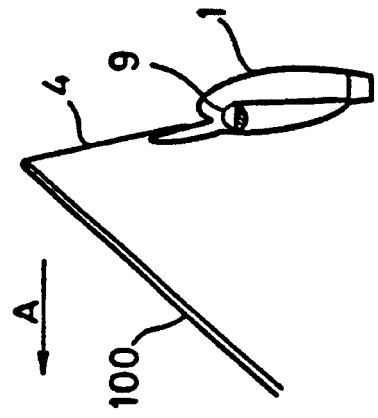
Figure 14C:
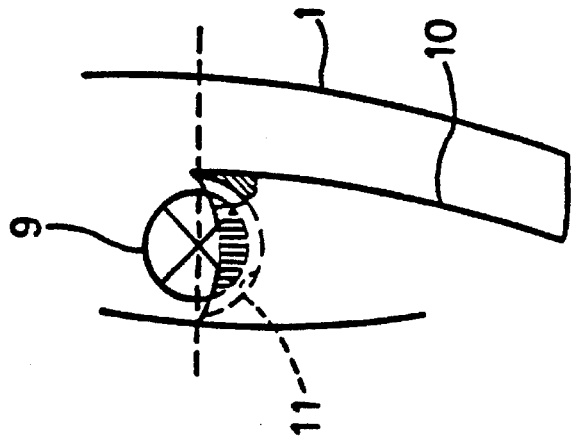

Furthermore, as shown in FIG. 13(c) and FIG. 14(c), the balance-weight 9 gets over an edge (see the inclined line) of the holder 11, and drifts away therefrom. Thus, a centroid of the lure is set in the rear portion of the lure body 1 by the balance-weight 9 which has moved to the rearmost portion of the lure body 1, thereby a long casting can be achieved.

In the above mentioned case, if the balance-weight 9 is not inserted into the holder 11, the lure body 1 is hung down through the fishing line 4 while the balance-weight 9 moves to the rearmost portion of the lure body 1. In this case, it will be possible to shift immediately to a casting action, and then a long casting also can be achieved.

When the fishing line 4 is drawn after alighting on the water, the lure body 1 inclines on the front side based on the water resistance against the lip 2. The balance-weight 9 then moves to the frontmost portion of the lure body 1 optimum for underwater cruising, thereby the balance-weight 9 is inserted into the holder 11, and held therein. Thus, the insertion of the balance-weight 9 into the holder 11 can set the centroid of the lure body 1 in the front thereof, and the lure body 1 maintains its optimum position for going underwater.

Figure 15:
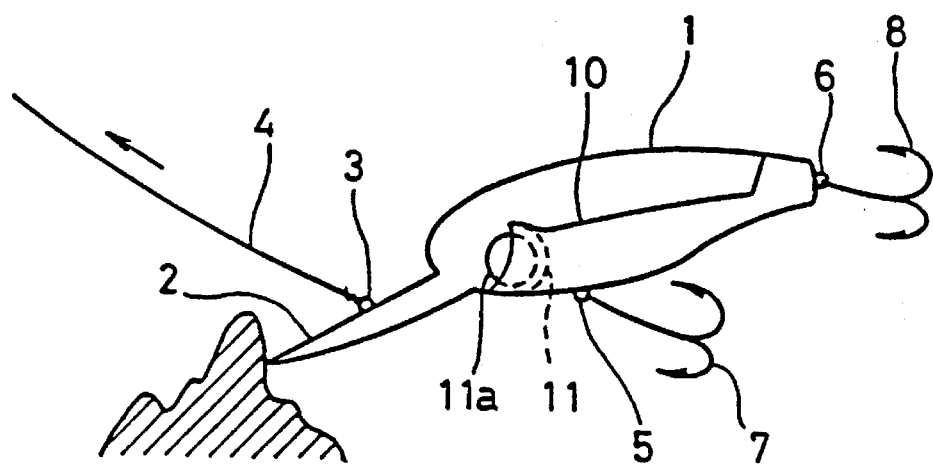
FIG. 15 shows a diagram indicating functions of the lure during the touch with an obstacle in the second embodiment.

As the holder 11 is formed as a relatively deep recess, which is not merely a pocket, the balance-weight 9 inserted into such the holder 11 is certainly held therein so that the cover 11a envelops it. Particularly, even though the lure body 1 going underwater touches with an obstacle in the bottom of the lake as shown in FIG. 15, the lure body 1 is prevented from drifting away from the holder 11. Accordingly, there is no danger the balance-weight 9 will drop out from the holder 11 when the lure body 11 touches with such an obstacle.

In accordance with the second embodiment of the present invention, the balance-weight 9 is held either in the front portion of the lure body 1 during a casting action, or in the rear portion of the lure body 1 during underwater cruising. Thereby, it is possible to hold and fix the lure body 1 in its optimum positions. Accordingly, both a casting performance and an underwater cruising performance are realized at the same time, and many advantages are given in several points, such as a simple arrangement, the manufacturing processes and the cost.

The third embodiment of a mechanism for moving and holding a balance-weight in the lure in accordance with the present invention will be explained with reference to FIGS. 16–23, 24(a), 24(b), 25(a), 25(b), 25(c), 26(a), 26(b) and 27.

Figure 16:
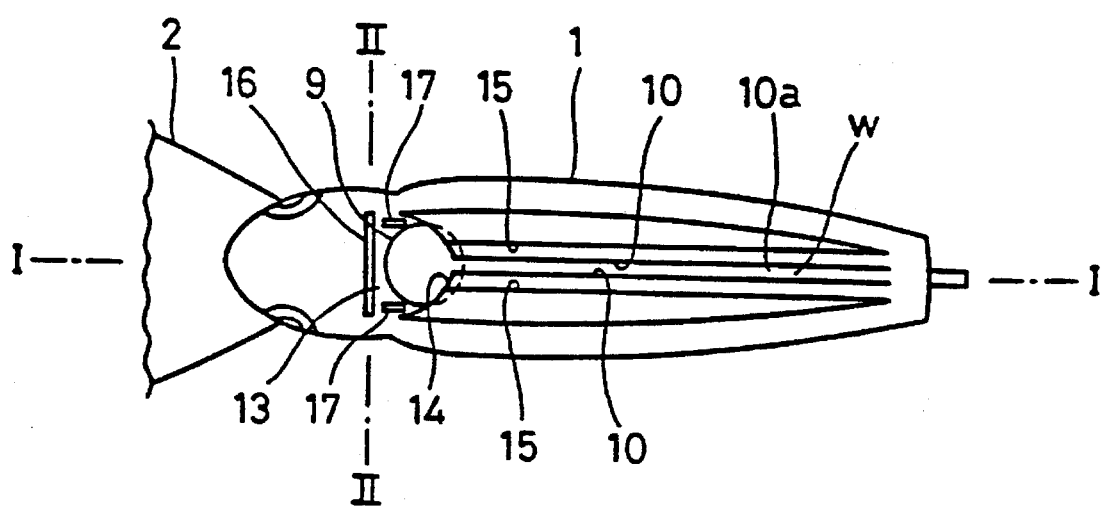
FIG. 16 shows a schematic top view of the third embodiment according to the present invention.
Figure 17:
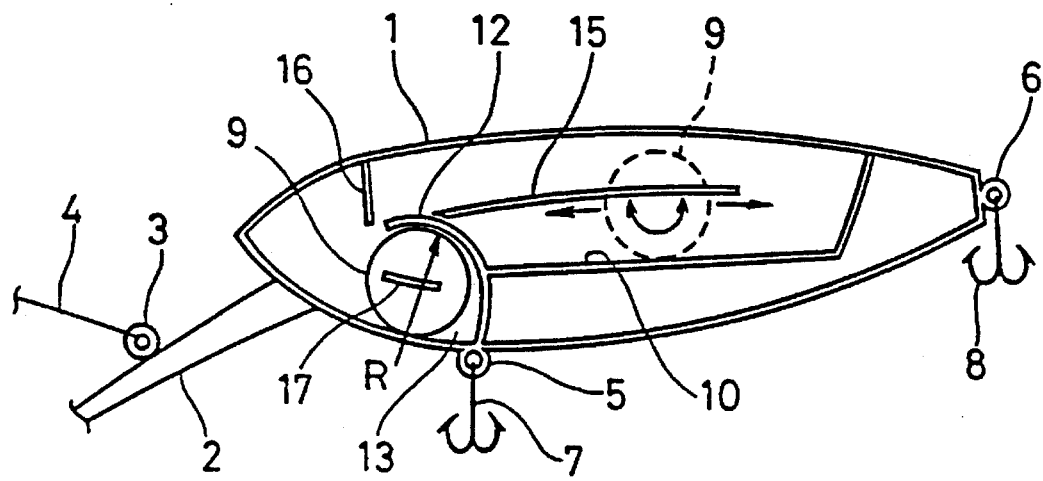
FIG. 17 shows a sectional view taken along the lines I–I of FIG. 16.

FIG. 16 and FIG. 17 show an overall schematic arrangement of a plug lure (e.g., a crank-bait lure) according to this embodiment. Referring to FIG. 16 and FIG. 17, a lure body 1 is made of plastics to have an outer shape similar to that of small fish, and has a schematically hollow structure. A lip 2 is mounted at the front end portion of the lure body 1 to properly incline downward. The lure body 1 incorporates a balance-weight 9. The balance-weight 9 is constituted by a ball made of a metal, e.g., iron, brass, or lead. The balance-weight 9 can be made by using a material other than metals. A guide 10 is provided along a longitudinal direction of the lure body 1. A slit 10a is formed in a longitudinal direction at the central portion of the guide 10. A width w of the slit 10a is set to be comparatively smaller than the diameter of the balance-weight 9, so that the balance-weight 9 can roll along the guide 10.

Figure 19:
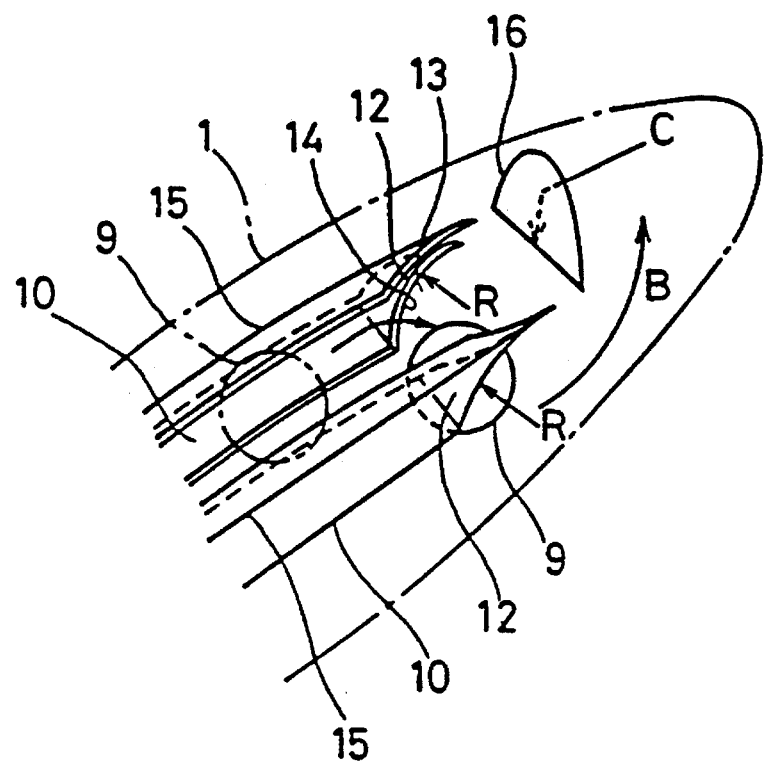
FIG. 19 shows a partial sectional view of the third embodiment according to the present invention.
Figure 20:
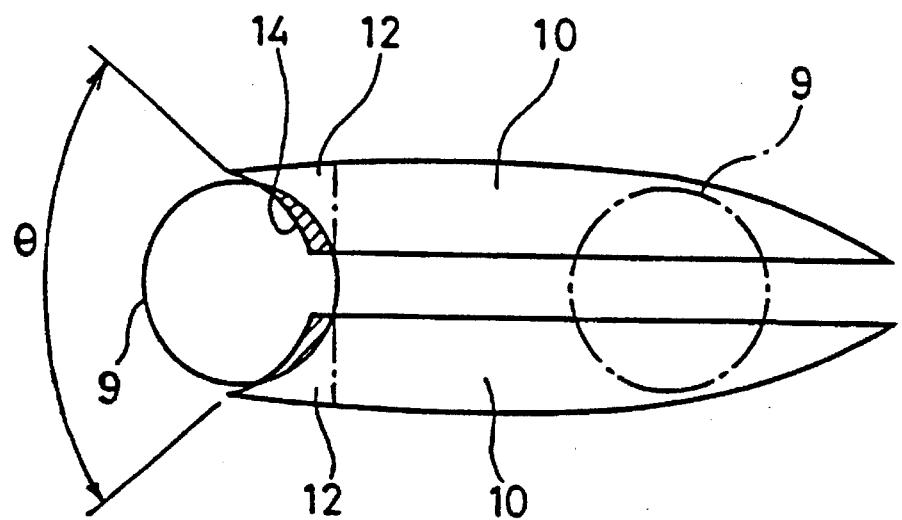
FIG. 20 shows a structure around a pocket of the third embodiment according to the present invention.

Holding plates 12 are continuously formed with the guide 10 so as to project upward from the front end of the guide 10 in a curved manner. The holding plates 12 define a pocket 13 in front of the guide lane 10. The pocket 13 has a gate 14 formed by partially cutting down the holding plates 12. As shown in FIG. 17 and FIG. 19, the holding plates 12 are curved at a radius R of curvature which is comparatively larger than the radius of the balance-weight 9, and the pocket 13 can hold the balance-weight 9 so as to wrap it. As shown in FIG. 20, the gate 14 is formed to spread toward the front portion of the lure body 1 at an angle θ.

The radius R of curvature of the holding plates 12 and the spreading angle θ of the gate 14 are set such that the balance-weight 9 can automatically drift away from the pocket 13 to the guide 10 side through the gate 14 when the lure body 1 is in an almost vertical state. In this case, optimum values of the radius R of curvature and the spreading angle θ are determined particularly in accordance with the diameter and weight of the balance-weight 9.

It is also possible to design the lure body 1 such that the balance-weight 9 automatically drifts away from the pocket 13 through the gate 14 when, e.g., the lure body 1 takes a pose other than the vertical pose, i.e., when the lure body 1 is inclined at, e.g., 50° or 70° with respect to the horizontal direction.

Figure 18:
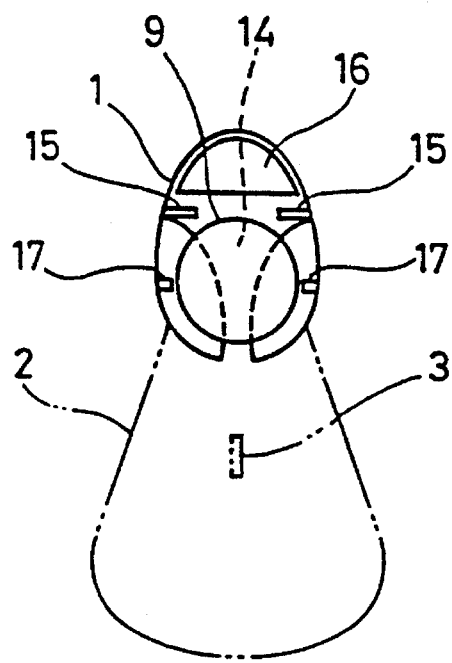
FIG. 18 shows a sectional view taken along the lines II–II of FIG. 16.

A pair of ribs 15 are provided on the upstream of the guide 10 to be parallel (FIG. 17) to it such that they sandwich the balance-weight 9 located on the guide 10 (see FIG. 16 and FIG. 18). The balance-weight 9 can move while maintaining a predetermined gap with respect to the respective ribs 15. A regulating plate 16 is provided above the front side of the pocket 13. The regulating plate 16 hangs at the front portion of the lure body 1 (the head portion of a small fish) downward to be close to the distal ends of the holding plates 12 (see FIG. 17 and FIG. 19). A pair of comparatively small ribs 17 are provided to sandwich the balance-weight 9 in the pocket 13 at a predetermined gap.

As shown in FIG. 17, a line ring 3 to which a line 4 can be tied is provided at an appropriate portion of the lip 2. A front hook 7 and a rear hook 8 are engaged with the lure body 1.

The mechanism for moving and holding a balance-weight in the lure according to this embodiment has the above arrangement, and the function thereof will be described.

Figure 21:
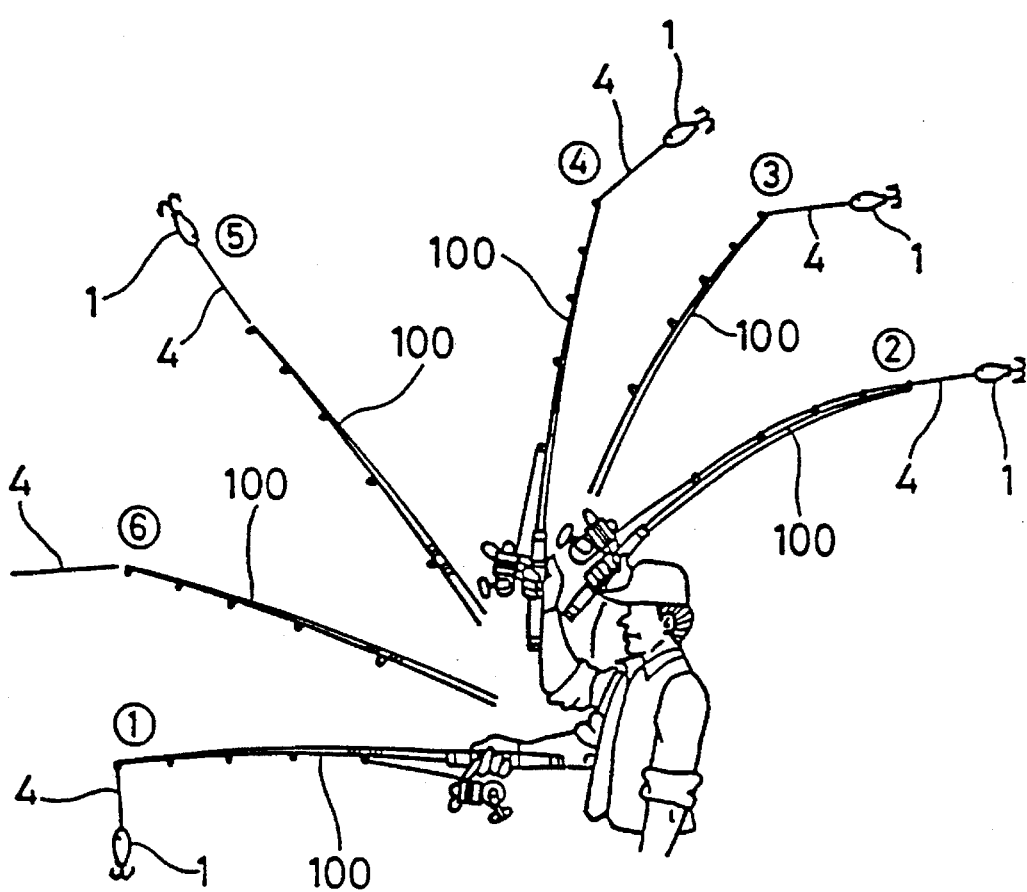
FIG. 21 shows a diagram indicating an example of a casting action in the third embodiment according to the present invention.

As described above, in a lure of this type, the balance-weight 9 is preferably set at the rear portion of the lure body 1 to perform long-distance casting. FIG. 21 shows an example of the casting action. In this case, a fishing rod 100 is thrown up by actions ① to ②, and is thrown down by actions ② to ⑥. The timing to release the lure body 1 is set between ③ and ④.

Figure 22:
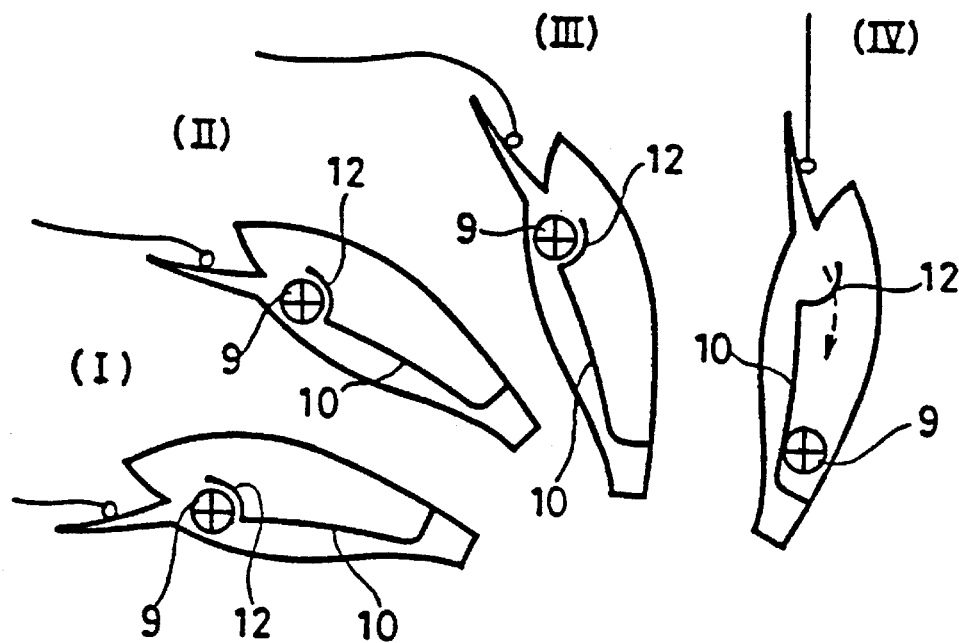
FIG. 22 shows a diagram indicating functions of the lure during casting in the third embodiment.

In this casting action, even if the lure body 1 is initially set horizontally as shown in FIG. 22, its pose changes as shown in (II), (III), and (IV), and is suspended from the fishing rod 100 through the line 4 at least momentarily as shown in (IV). The balance-weight 9 which is held in the pocket 13 in the state (I) automatically drifts away from the pocket 13 to the guide 10 side through the gate 14 when the lure body 1 is set in the vertical state, as shown in (IV). Thus, the balance-weight 9 is set at the rear portion of the lure body 1. At the start of the casting action indicated by ① of FIG. 21, the centroid is moved to the rear portion of the lure body 1, which is optimum for long-distance casting.

Figure 23:
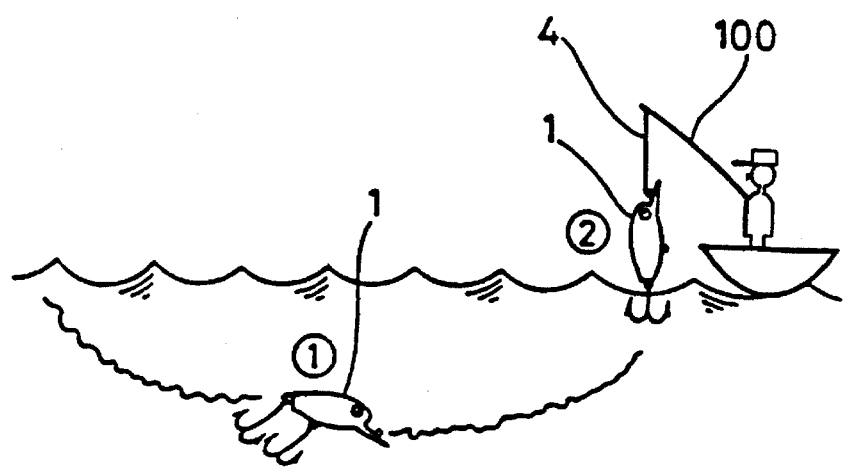
FIG. 23 shows a schematic diagram indicating functions of the lure during picking up in the third embodiment.

As shown in FIG. 23, when the lure body 1 which swims as indicated by ① is rewound and picked up as indicated by ②, the lure body 1 is always set in the vertical state as indicated by ②. Accordingly, also in this case, the centroid is shifted to the rear portion, which is optimum for long-distance casting. In the casting action following this, the balance-weight 9 is set at the rear portion of the lure body 1. In this manner, in casting, the balance-weight 9 drifts away from the pocket 13 and is moved to the rearmost portion of the lure body 1. Thus, the centroid is set in the rear portion of the lure body 1.

In particular, in the conventional magnet centroid-fixed lure described above, the balance-weight cannot be sometimes unlocked depending on the force of the fisherman applied for casting. In particular, in a strong wind, when the fisherman wishes to set the lure to alight softly on the water at a short distance against the wind, if the balance-weight cannot be unlocked in this manner, even a point at a short distance cannot be correctly aimed at. According to the mechanism of the present invention, when the casting action is started, since the balance-weight 9 has been automatically unlocked, as described above, the centroid can always be set for casting reliably and smoothly regardless of the force applied for casting.

When the cast lure body 1 is to be recovered by rewinding, the lure body 1 is set in the vertical state as it is picked up, and the centroid can be automatically shifted, so that a casting action for a next point can be quickly started.

After the lure body 1 alights on the water by casting, when the line 4 is drawn, the lure body inclines on the front side based on the water resistance against the lip 2 at its front end portion. Hence, the balance-weight 9 rolls along the guide 10 and passes the gate 14 to move to the frontmost portion of the lure body 1, so that the lure body 1 is set at an acute angle to go underwater deepest. During underwater cruising, the lure body 1 gradually takes a horizontal pose, and the balance-weight 9 is inserted in the pocket 13.

In this case, since the gate 14 has a predetermined spreading angle θ, the balance-weight 9 can be smoothly inserted in the pocket 13. When the balance-weight 9 moves along the guide 10, it is guided by the ribs 15 from its two sides, so that smooth movement of the balance-weight 9 is guaranteed. In this manner, the lure body 1 during underwater cruising can be maintained at an optimum underwater cruising pose by setting and holding its centroid at the front portion.

The balance-weight 9 inserted in the pocket 13 is held to be wrapped by the holding plates 12, thereby effectively preventing the balance-weight 9 from drifting away from the pocket 13.

As described above, the regulating plate 16 is provided above the front portion of the pocket 13. When, e.g., the lure body 1 collides against an obstacle or the like, and the balance-weight 9 moves as indicated by an arrow B of FIG. 19, the regulating plate 16 regulates the movement of the balance-weight 9, as indicated by an arrow C of FIG. 19. Accordingly, the balance-weight 9 is prevented from floating up accidentally and is thus always held stably in the pocket 13. The ribs 17 of the pocket 13 hold the balance-weight 9 by sandwiching it from the two sides.

Figure 24A:
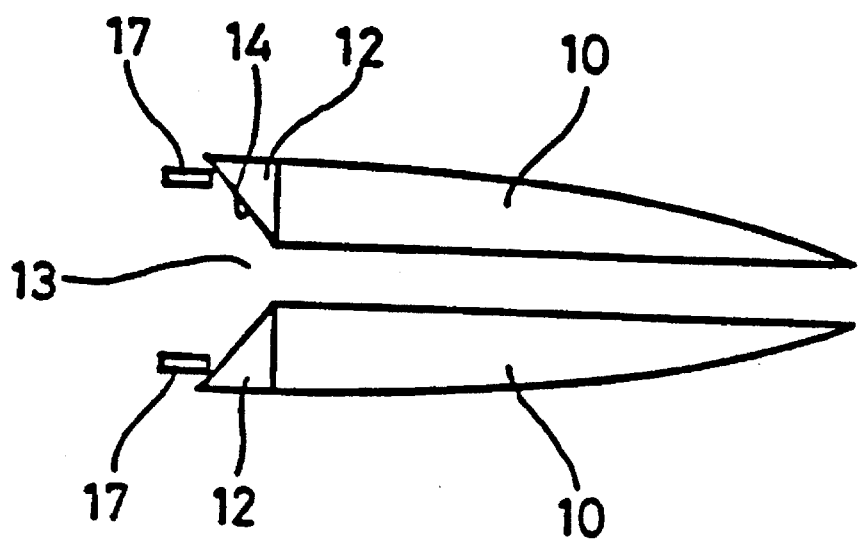
FIGS. 24(a) and 24(b) show top views indicating exemplary features to form a gate in the third embodiment according to the present invention.
Figure 24B:
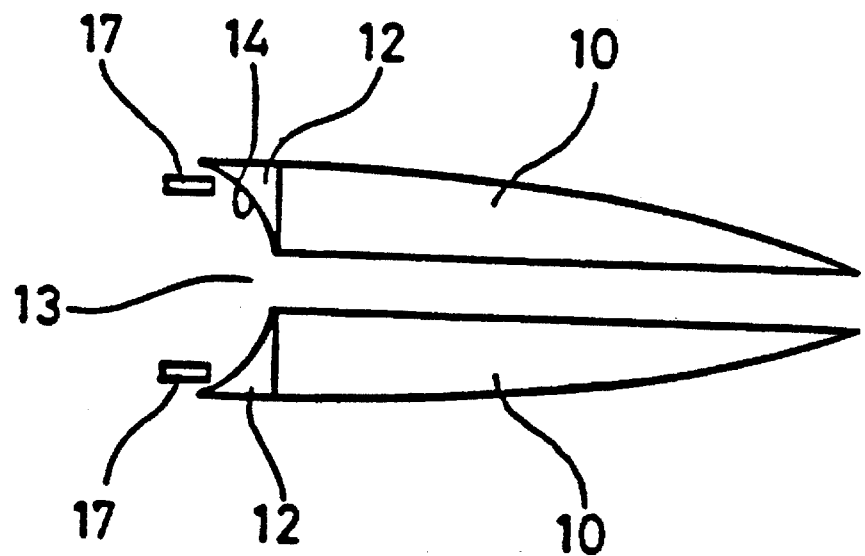

FIGS. 24(a) and (b) includes modification of the holding plates 12 in which the pocket 13, i.e., the gate 14, is to be formed. The gate 14 may be linearly formed, as shown in FIG. 24(a), or may be slightly curved, as shown in FIG. 24(b). The shape of the gate 14 can be freely selected in accordance with the application of the lure.

Figure 25A:
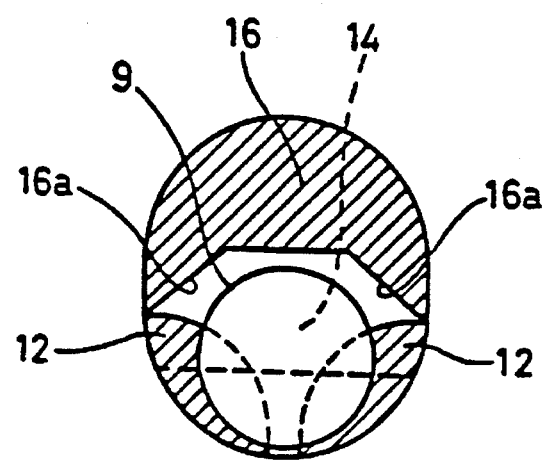
FIGS. 25(a), 25(b) and 25(c) shows partial sectional views indicating exemplary features of regulating plates in the third embodiment according to the present invention.
Figure 25B:
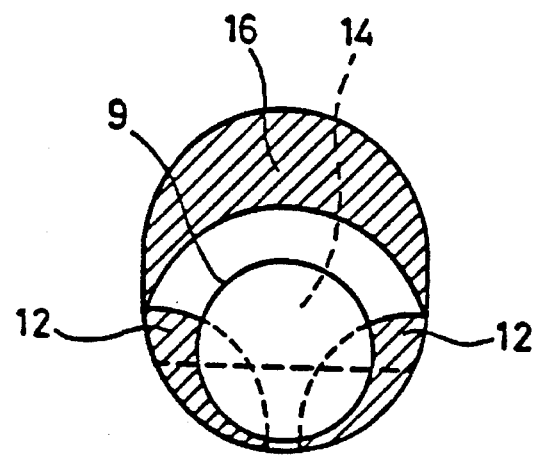
Figure 25C:
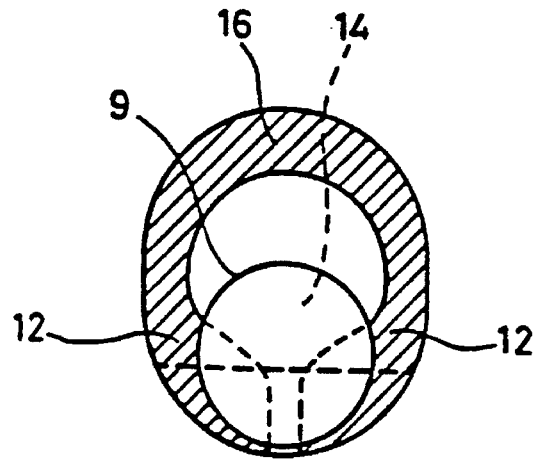

FIGS. 25(a), (b) and (c) include modifications of especially the regulating plate 16. Inclined portions 16a may be formed at the two sides of the lower end portion of the regulating plate 16, as shown in FIG. 25(a). With this shape, the balance-weight 9 can be held in the pocket 13 with an improved property especially for lateral turning of the lure body 1. Alternatively, as shown in FIG. 25(b), the entire lower end portion of the regulating plate 16 may be curved. Also in this case, the balance-weight 9 can be held with an improved property. Furthermore, as shown in FIG. 25(c), a regulating plate 16 may be unified with holding plates 12, and a gate 14 may be formed to be comparatively narrow. Then, the balance-weight 9 cannot be unlocked unless the lure body 1 is set in the vertical state.

Figure 26A:
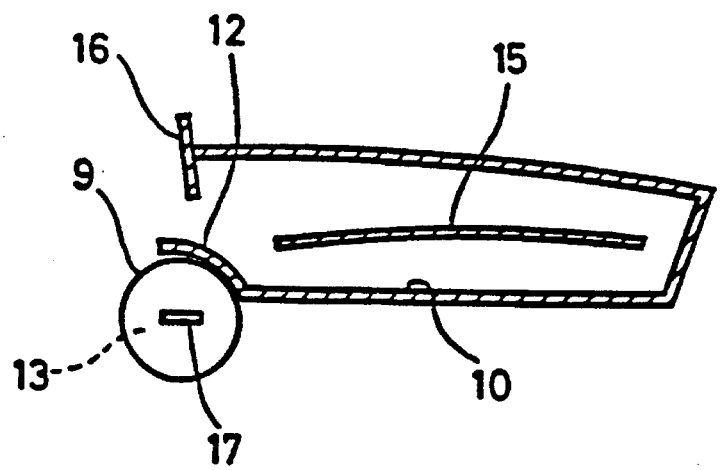
FIGS. 26(a) and 26(b) shows partial sectional views indicating holding manners of the balance-weight in the third embodiment according to the present invention.
Figure 26B:
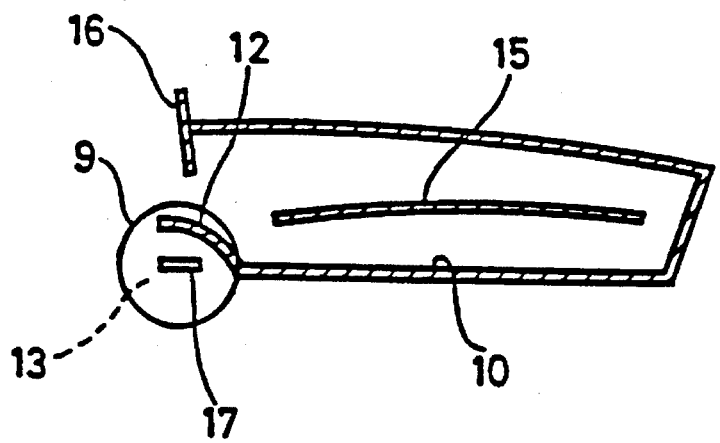

FIGS. 26(a) and (b) include modifications regarding how to hold the balance-weight 9 in the pocket 13. For example, as shown in FIG. 26(a), the balance-weight 9 may be held such that it is pressed downward by the holding plates 12. Alternatively, as shown in FIG. 26(b), the balance-weight 9 may be held such that it is pressed obliquely downward or laterally. When a holding method is selected in this manner, the magnitude of the force for holding the balance-weight 9 can be appropriately adjusted.

Figure 27:
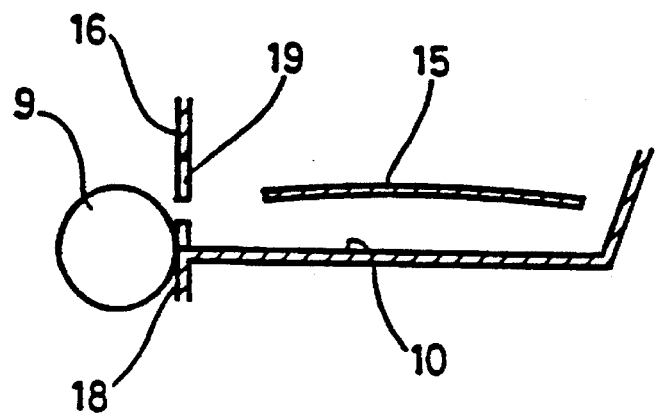
FIG. 27 shows a partial sectional view of the lure indicating exemplary features in which a vertical plate is provided in the third embodiment according to the present invention.

As shown in FIG. 27, a regulating plate 16 and a vertical plate 18 may be continuously provided vertically such that the vertical plate 18 is under the regulating plate 16, and a hole 19 for passing the balance-weight 9 therethrough may be formed at a position at the almost same level as that of the guide 10. In this example, the vertical plate 18 can serve also as a pocket 13. However, the balance-weight 9 is held with a slightly weak force when compared to a case wherein it is held in the pocket 13 described above.

Figure 28:
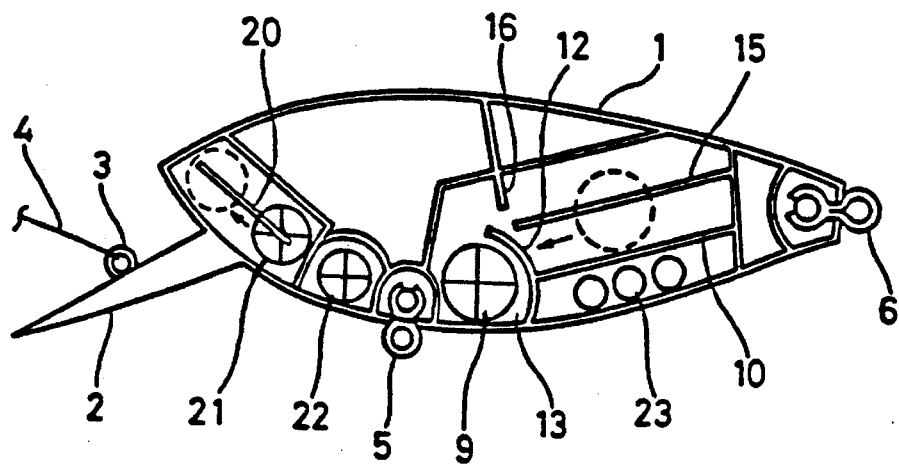
FIG. 28 shows a sectional view of a modified lure having two mechanical structures for moving a centroid in the third embodiment according to the present invention.

FIG. 28 shows another embodiment in which another centroid shift mechanism is provided at the front portion of a lure body 1 in addition to the balance-weight moving and holding mechanism shown in FIG. 16 and the like. More specifically, a pair of ribs 20 having a predetermined length are provided to extend from the front end portion of the lure body 1 backward, and another balance-weight 21 guided by the ribs 20 moves back and forth with a predetermined stroke. A stationary balance-weight 22 is provided between the balance-weight 21 and a balance-weight 9. The stationary balance-weight 22 is necessary to stabilize the movement of the lure. However, when a holding mechanism is provided to the balance-weight 21, a stable operation can be guaranteed without using the balance-weight 22.

In this case, a plurality of comparatively small (lightweight) members 23 made of, e.g., glass beads or brass balls, that produce a high-pitched sound upon being collided against each other, are inserted in the gap (space) under the guide 10. An enhanced fish-luring effect can be obtained with the sound produced by the members 23.

According to the lure shown in

FIG. 28, the two balance-weights 9 and 21 are moved. Thus, as shown in

Figure 29A:
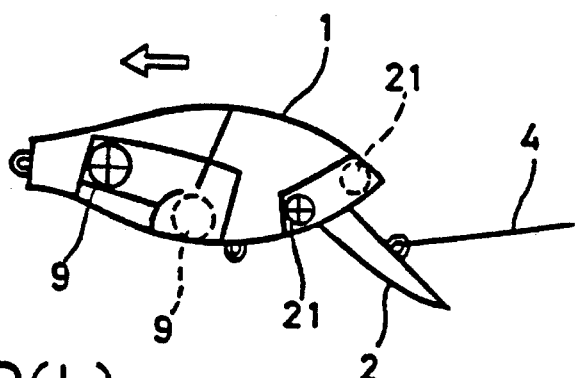
FIG. 29(a) and 29(b) shows a diagram indicating a casting pose and a floating pose of the lure having two mechanical structures for moving a centroid.
Figure 29B:
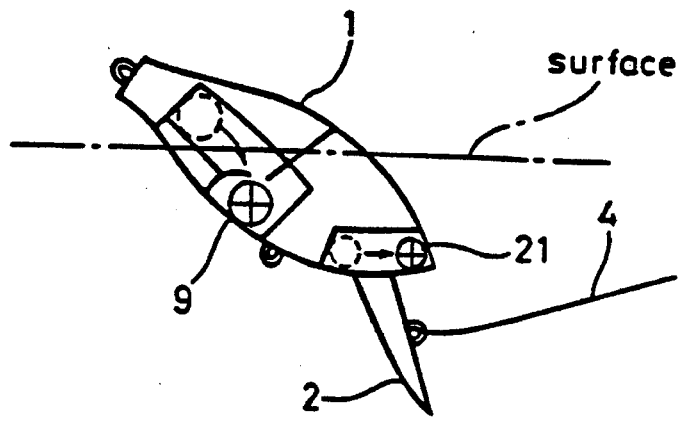
Figure 30:
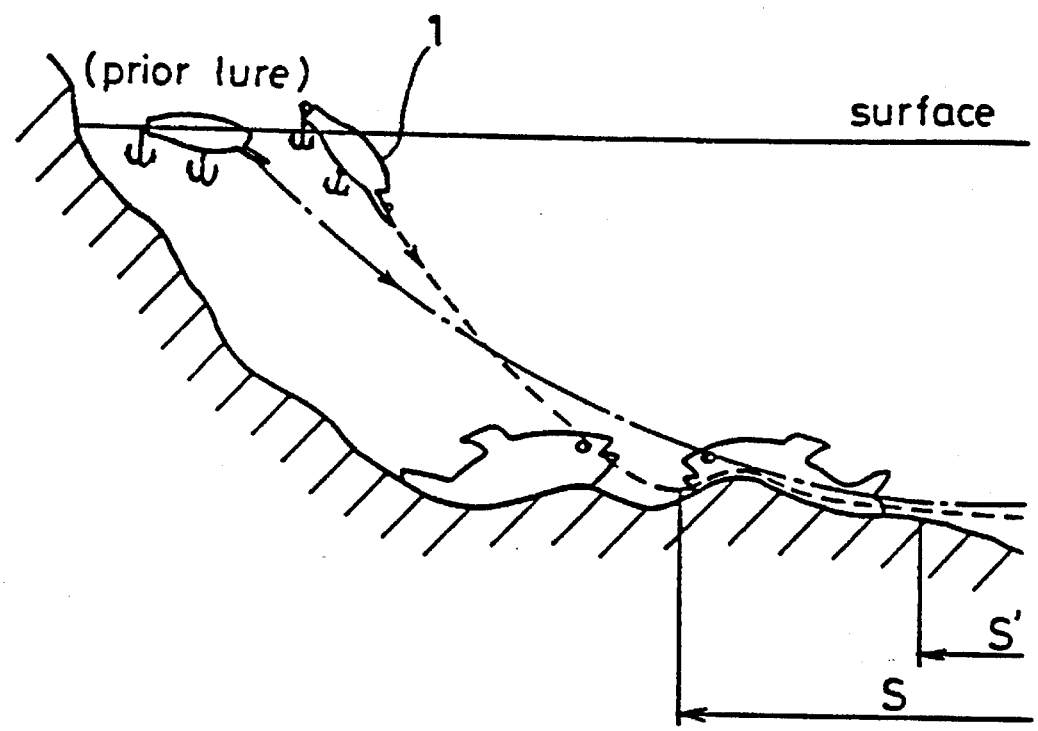
FIG. 30 shows a diagram indicating a trace of underwater cruising of the lure having two mechanical structures for moving a centroid.

FIG. 29(a), during casting, since the balance-weights 9 and 21 are moved backward, the flying distance of the lure can be greatly increased. After casting, when the lure alights on the water, the balance-weight 9 is inserted in the pocket 13, as shown in FIG. 29(b), and the balance-weight 21 is moved to the front end portion of the lure body 1, so that the lure floats at an acute angle with respect to the water surface. When the line 4 is drawn, the lure body 1 goes underwater at an acute angle, as indicated by a broken line in FIG. 30, and quickly reaches the bottom of the lake. Thereafter, the lure swims on the bottom of the lake to search for points on the bottom of the lake over a wide range. In particular, to catch fish living in the bottom of the lake, the longer the time (or distance) the lure exists on the bottom of the lake, the better. When the lure goes underwater at an acute angle as described above, points on the bottom of the lake over a wide range can be searched for, which is very effective for catching fish living in the bottom of the lake. As shown in FIG. 30, according to the present invention, an area S within which the points on the bottom of the lake can be searched for in lure fishing is greatly larger than an area S' within which points on the bottom of the lake can be searched for in conventional lure fishing.

Figure 31:
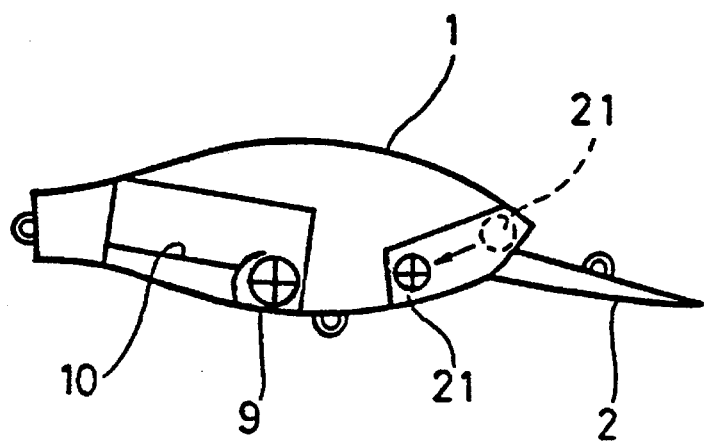
FIG. 31 shows a diagram indicating a condition of a balance-weight during swimming horizontally of the lure having two mechanical structures for moving a centroid.

Also, as shown in FIG. 31, the balance-weight 9 is inserted in the pocket 13 and the balance-weight 21 is moved backward in the lure body 1 by adjusting the drawing degree of the line 4, thereby causing the lure body 1 to swim substantially horizontally. This horizontal swimming is very similar to swimming of an actual small fish, which is very effective for fishing, e.g., carnivorous fish.

Figure 32:
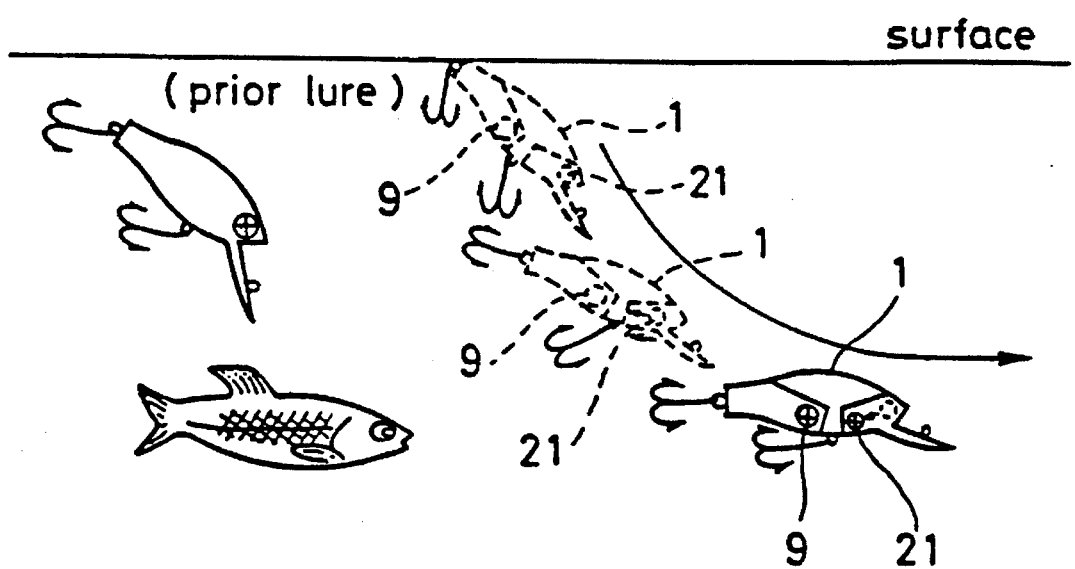
FIG. 32 shows a diagram indicating a trace of underwater cruising during swimming horizontally of the lure having two mechanical structures for moving a centroid.

As shown in FIG. 32, in a conventional lure that can go underwater deeply, since the balance-weight is fixed at the front portion of the lure body, the lure swims in an inclined manner, which is very different from swimming of actual small fish.

The present invention has been described by way of preferred embodiments. The mechanism for moving and holding the balance-weight according to the present invention can be applied to plug lures of any types. Even when the present invention is applied to, e.g., a minnow type lure, a function and an effect which are the same as those of the above embodiments can be obtained.

As has been described above, according to the present invention, when compared particularly to a conventional magnet centroid-fixed lure, no magnet is used, and the major components are integrally formed with the lure body 1. Therefore, an operation for assembling the magnet and the like in the lure body 1 becomes unnecessary, so that the productivity is increased, and the manufacturing cost is decreased.

Furthermore, in the magnet centroid-fixed lure, no material other than a magnetic material can be used to form the balance-weight, imposing limitations on selection of the material. However, in the lure according to the present invention, other than the magnetic material, any types of materials (having any specific gravity) e.g., brass or lead, can be selected. Therefore, lures having different weights in accordance with the fishing conditions while having the same body size can be freely realized.

In a mere centroid movable lure, the fishing ability of luring fish, which is the original object of a lure, is not necessarily sufficient because swimming is unstable and the swimming balance is lost due to collision against an obstacle or the like. However, according to the present invention, a constantly stable lure action can be ensured, thereby effectively luring a fish. Furthermore, in the casting action, the centroid is automatically shifted to the rear portion of the lure body 1, which is optimum for long-distance casting, thus guaranteeing smooth casting and the like.

I claim:

1. A lure having a mechanism for moving and holding a balance-weight, the lure comprising:

a lure body having exterior walls defining an interior;

a lip mounted at a front end portion of the lure body;

an interior wall forming a guide channel in the interior of the lure body between the front end portion and a rear portion of the lure body wherein the guide channel is formed by the exterior wall on a top side of the lure body and the interior wall; and a balance-weight incorporated in said lure body, wherein said balance-weight is adopted to be movable along a longitudinal direction of said lure body by rolling along the guide channel, said guide channel having a pocket provided at the front end portion thereof wherein the pocket is formed by extending the interior wall to the exterior wall at a bottom side of the lure body wherein the bottom side is opposite the top side and further wherein the balance-weight is hold within said pocket in a first position and movable in the guide channel to a second position remote from the first position.

2. The lure according to claim 1 wherein a water inlet is opened to a front end portion of said lip.

3. The lure according to claim 1 further comprising:

a holder having a cover formed in the front end portion of said guide channel so that said balance-weight can be held in said holder.

4. The lure according to claim 3 wherein said holder is formed as a relatively deep recess.

5. The lure according to claim 1 further comprising:

holding planes defining a pocket wherein the holding plates are continuous and protrude to form tapering walls from a front end of said holding plates; and a gate constructed and arranged such that the pocket formed between the tapering walls and the gats contains said balance-weight within said pocket.

6. The lure according to claim 5 wherein said balance-weight can drift away from said pocket through said gate when said lure body is positioned substantially vertically.

7. The lure according to claim 5 wherein a regulating plate is substantially hung down above a front portion of said pocket.

8. A lure having a mechanism for moving and holding a balance-weight, the lure comprising:

a lure body defining an interior;

lip mounted at a front end portion of the lure body;

an interior wall forming a guide channel in the interior of the lure body between the front end portion and a rear portion of the lure body;

a balance-weight incorporated in said lure body, wherein said balance-weight is adopted to be movable along a longitudinal direction of said lure body by rolling along the guide channel, said guide channel having a pocket provided at the front end portion thereof wherein the balance-weight is held within said pocket in a first position and movable in the guide channel to a second position remote from the first position;

holding plates defining a pocket wherein the holding plates are continuous and protrude to form tapering walls from a front end of said holding plates; and a gate constructed and arranged such that the pocket formed between the tapering walls and the gate contains said balance-weight within said pocket.

9. The lure according to claim 8 wherein said balance-weight can drift away from said pocket through said gate when said lure body is positioned substantially vertically.

10. The lure according to claim 8 wherein a regulating plate is substantially hung down above a front portion of said pocket.

* * * * *

UNITED STATES PATENT AND TRADEMARK OFFICE
CERTIFICATE OF CORRECTION

PATENT NO. : 5,566,498　　　　　　　　　　　Page 1 of 2
DATED : October 22, 1996
INVENTOR(S) : Koichi Itoh It is certified that error appears in the above-identified patent and that said Letters Patent is hereby corrected as shown below:

| | |
|---|---|
| Column 4, line 1, change "shows" to --show-- | Page 7, line 2 from bottom |
| Column 4, line 31, change "shows" to --show-- | Page 8, line 2 from bottom |
| Column 4, line 42, change "shows" to --show-- | Page 9, line 9 |
| Column 6, line 52, change "follow" to --flow-- | Page 14, line 13 |
| Patent | Amendment dated 5/8/96 |
| Column 12, line 53, change "hold" to --held-- | Claim 1, line 16 |

UNITED STATES PATENT AND TRADEMARK OFFICE
CERTIFICATE OF CORRECTION

PATENT NO. : 5,566,498
DATED : October 22, 1996
INVENTOR(S) : Koichi Itoh

It is certified that error appears in the above-indentified patent and that said Letters Patent is hereby corrected as shown below:

Column 13, line 2, change "gats" to -- gate --

Signed and Sealed this

Twenty-fifth Day of August, 1998

Attest:

Attesting Officer

BRUCE LEHMAN

Commissioner of Patents and Trademarks